United States Patent [19]
Schulz

[11] 3,951,293
[45] Apr. 20, 1976

[54] GAS-PERMEABLE, LIQUID-TIGHT CLOSURE

[75] Inventor: Horst Schulz, Hanover, Germany

[73] Assignee: Riedel-De Haen Aktiengesellschaft, Seelze, Germany

[22] Filed: Jan. 21, 1975

[21] Appl. No.: 542,707

[30] Foreign Application Priority Data
Jan. 24, 1974  Germany.............................. 2403244

[52] U.S. Cl................................. 215/261; 55/505; 55/528
[51] Int. Cl.²......................................... B65D 53/04
[58] Field of Search.................... 215/261, 307, 308; 220/367, 369, 370, 371, 372, 373; 55/505, 528

[56] References Cited
UNITED STATES PATENTS

| | | | |
|---|---|---|---|
| 2,298,938 | 10/1942 | Griffin | 220/373 |
| 3,326,401 | 6/1967 | Delong | 215/308 |
| 3,448,882 | 6/1969 | Roy | 215/261 |
| 3,520,416 | 7/1970 | Keedwell | 55/528 X |
| 3,664,915 | 5/1972 | Gore | 264/288 |

FOREIGN PATENTS OR APPLICATIONS

| | | | |
|---|---|---|---|
| 507,941 | 6/1939 | United Kingdom | 220/371 |
| 965,016 | 5/1957 | Germany | 220/367 |
| 513,877 | 12/1930 | Germany | 215/308 |

*Primary Examiner*—Donald F. Norton
*Attorney, Agent, or Firm*—Connolly and Hutz

[57] ABSTRACT

A gas-permeable liquid closure for containers of liquids or solids which emit or absorb gas is provided by a film of an unsintered tetrafluoroethylene having a thickness of from about 0.1 to 3 mm., a fibrillated structure and a density of less than about 1.4. The film is supported across an opening of the container by a perforated cap or perforated sealing diaphragm which is disposed on either one or both sides of the film.

14 Claims, 6 Drawing Figures

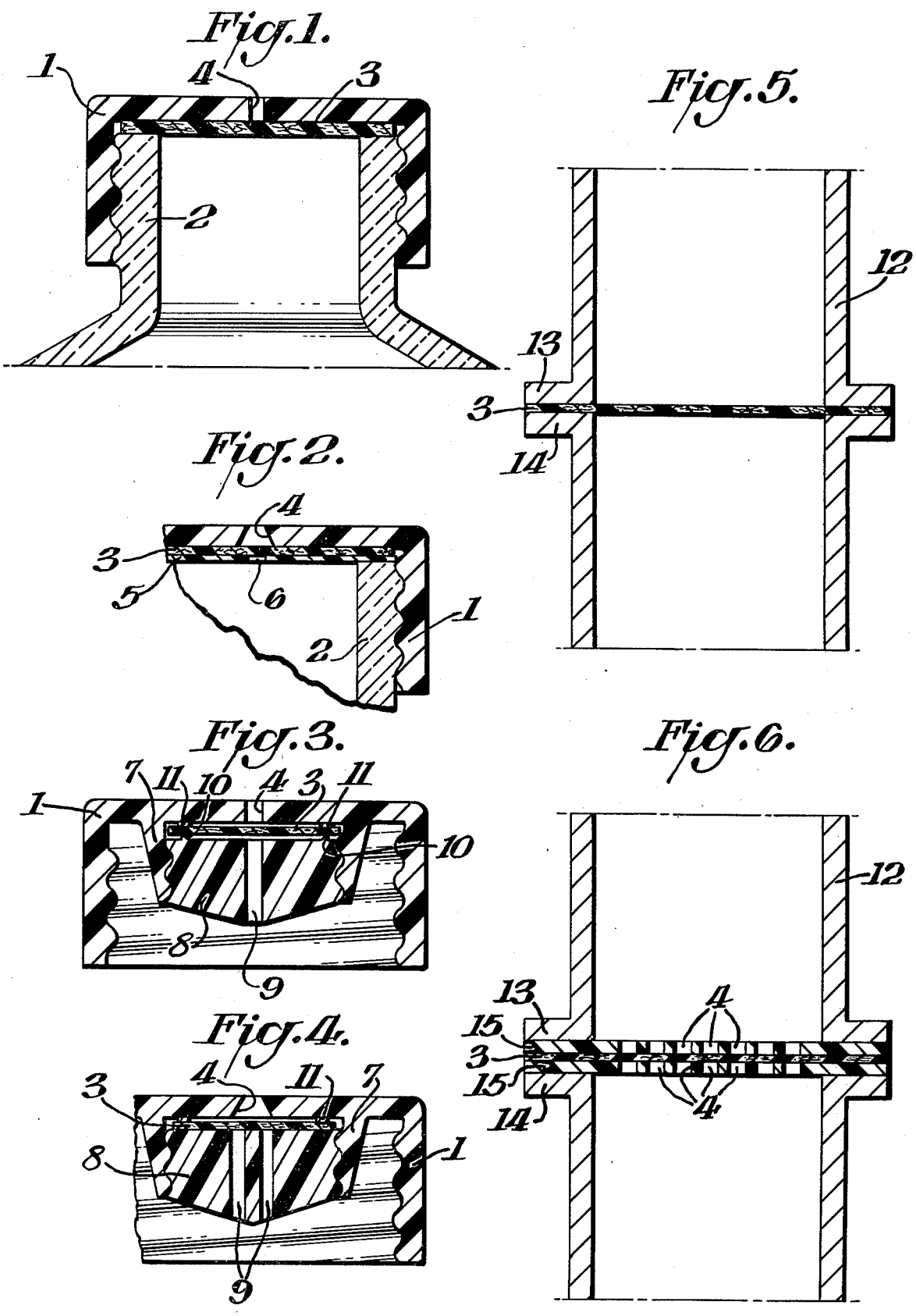

GAS-PERMEABLE, LIQUID-TIGHT CLOSURE

BACKGROUND OF THE INVENTION

The invention relates to a gas-permeable, liquid-tight closure, particularly a vented stopper.

In liquid-containing technical installations, e.g. in pipe lines and other liquid-containing apparatus, shut-off devices are often required which prevent the passage of liquids or solids but which should allow the passage of gases, if possible in both directions, i.e. which afford an equalization of pressure.

These shutoff devices are often required in the form of specially constructed closures, such as so-called venting stoppers, also for the closure of storage and transporting containers for liquid or solid substances. In storage or transporting containers for liquid or solid substances, particularly chemicals, excess or reduced pressures may set in after the filling and closing. A reduced pressure may result, for example, by the adsorptive or absorptive bonding of the gaseous phase to the container contents. Excess pressure may form, for example, by the decomposition or degassing of the contents of the container; the decomposition may be accelerated or multiplied due to an accidental or unavoidable elevation of the temperature during transfer or storage and/or due to catalytic effects, of the container material or by foreign matter, for example. The excess or reduced pressures may become so great that it can result in the failure of the closure and/or the container. In order to avoid this, there are known specially constructed container closures, which should enable the degassing of the container. The simplest construction of such a container closure consists of having the closure, e.g. the plug, bored through and having an air line inserted into the bore. Another such closure (German Pat. No. 435,247) consists of a stopper of chemically resistant material, e.g. porcelain, which on the bottom has several openings ending in a hollow space, which is closed from above by a porous filter plate. Furthermore, a safety bottle stopper is known (German Pat. No. 122,472), consisting of a resilient stopper, to be pushed into the bottle mouth, with a cavity or bore and a fine perforation leading toward the interior of the bottle, which is pressed together by the resilient material of the stopper and is closed thereby; when the interior pressure rises beyond a predetermined amount, however, it is opened by the gases for the purpose of bleeding off the excess pressure. Other closures are perforated and have perforated sealing disks. Such closures with perforated sealing disks are also constructed with shaped labyrinth passages. Vent stoppers are also known with spring-loaded valve members, flexible membranes and with prestressed molded parts or material parts in closure combinations.

The known vent stoppers are in part operative only with an upright position of the container. Upon an inclination of the container, a liquid filling may discharge from the closure system, something which is undesirable, depending on the type of contents, might even be dangerous. In order to prevent an escape of the liquid contents from a container on an inclination of the container, closures have been constructed which perform the venting by pendulums or weights only with a normal position of the container. Another vent stopper dependent on position (published German Patent application No. 1,965,519) for liquid containers consists of a stopper with a chamber, which is connected with the interior of the container by a channel and with the atmosphere by an opening. The chamber is partially filled with a liquid metal, normally mercury, and formed in such a manner that the liquid metal closes the channel upon an inclination of the container.

Prior vent stoppers were unsatisfactory either in their manner of functioning or were too cumbersome and expensive in their manufacture.

SUMMARY

The novel gas-permeable stopper of this invention may be employed as a stopper for pipe lines and other liquid-containing units, e.g. as an excess pressure safety valve or as a check valve, but especially as a venting closure. The vent stopper is suitable for containers of all kinds, it operates absolutely dependably and is simple to manufacture.

The novel stopper contains as the gas-permeable material a layer of 0.1 to 3 mm, and preferably in a thickness of 0.1 to 1 mm, comprising an unsintered tetrafluoroethylene polymer with a fibrillated structure and a density of less than about 1.4.

The novel stopper, in its construction as a venting closure, comprises a closure, known per se, which is provided with at least one opening for the passage of gases, the opening being sealed or covered by a layer having a thickness of about 0.1 to 3 mm. and preferably 0.1 to 1 mm.

The unsintered tetrafluoroethylene polymer with the fibrillated structure and a density of less than about 1.4 may comprise a polytetrafluoroethylene or of a mixed polymer e.g. tetrafluoroethylene/hexafluoropropylene. The polymer may also be surface-sintered.

The invention is based on the novel and unexpected result that a film or layer having a thickness of 0.1 to 3 mm. and preferably 0.1 to 1 mm. consisting of an unsintered tetrafluoroethylene polymer with a fibrillated structure and a density of less than about 1.4 allows the passage of gases but not liquids (and of course, no solids also). With the use of the unsintered tetrafluoroethylene polymer with a fibrillated structure and a density of less than about 1.4 in a layer of fibrillated thickness of about 0.1 to 3 mm. and preferably 0.1 to 1 mm., there may be constructed superior gas-permeable liquid-tight stoppers, especially however, venting closures.

The unsintered tetrafluoroethylene polymer with a fibrillated structure and a density of less than about 1.4 is an almost white, highly flexible material, which is sold in the shape of disks, cutouts and formed parts under the trademark Gore-Tex by the company Gore, W. L. Gore & Co. GmbH, 8011 Putzbrunn, near Munich, Germany. This material can be prepared in accordance with the process disclosed in published German Pat. application No. 2,028,393, which corresponds to U.S. Pat. No. 3,664,915. According to U.S. Pat. No. 3,664,915, the unsintered tetrafluoroethylene polymer with a fibrillated structure and a density of less than about 1.4 is uniaxially expanded and oriented and is employed for the sealing of threaded joints in the form of strips or tapes, which are wound around the thread profile prior to joining. Also known are the uses of thicker tapes or strands of this material as rod packing. It has not been known previously, however, that this material is permeable to gases when it is in the form of a film having a thickness of from about 0.1 to 3 mm. and preferably 0.1 to 1 mm. or that it is suitable for the preparation of breathing closures, i.e. closures which pass gases through in both directions. In the prior uses of the material, a permeability for gases did not manifest itself.

In accordance with the present invention, the openings or the sections where a pressure equalization should take place, i.e. a passage of gases but not solid or liquid substances are sealed or covered by a film having a thickness of from about 0.1 to 3 mm. and preferably 0.1 to 1 mm. of unsintered tetrafluoroethylene polymer with a fibrillated structure and a density of less than about 1.4. This may be provided, for example, in that the film is held by a holding means, e.g. a flanged coupling joint, sleeve joint, plug joint, screw connection, by a bored stopper or the like or is stretched out over the section or opening. The openings or sections, which allow gases to pass through (but not liquids or solids) may be round, square, rectangular, oval or have any other shape. Round sections can have diameters of a few millimeters up to 50–60 centimeters or more. The quantity of gas passing through the film per time unit is proportional to the surface of the film available for the passage of gas. In some instances, e.g. in containers closures, the entire surface of the closure opening of the container need not be covered or sealed by the film of unsintered tetrafluoroethylene polymer with a fibrillated structure having a density of less than about 1.4. Moreover, it may be sufficient to construct the shutoff device, particularly the closure, in such a manner that the surface of the film of unsintered tetrafluoroethylene polymer with a fibrillated structure having a density of less than about 1.4 amounts to only a portion, e.g. only the half, of the cross-sectional area of the container opening or of the pipe cross-section. It may be suitable to support the films to be used on one or both sides by supporting members, e.g. perforated disks, diaphragms, lattices, meshes or grates or the like. It is suitable to stretch out the films between holding devices which reliably prevent slipping of the film. Holding devices with such properties can have distinct profile rings.

The novel shutoff device constructed of a venting closure according to the invention is suitable for closing containers of various construction and size, thus amount other things, for the closing of narrow and wide-necked bottles, capsules, boxes, cans and barrels. The normal closures for such containers, e.g. covers, threaded caps, plugs or stoppers, may be easily constructed into the present novel venting closures in that they can be provided with a bore or several bores for connecting the container contents with the atmosphere, and subsequently are sealed or covered with a film of unsintered tetrafluoroethylene polymer with a fibrillated structure having a thickness of about 0.1 to 3 mm. and preferably 0.1 to 1 mm. and a density of less than about 1.4. The covering takes place most simply in that on the inside of the actual closure there is attached before the openings a disk having a thickness of about 0.1 to 3 mm. and preferably 0.1 to 1 mm. of unsintered tetrafluoroethylenepolymer with a fibrillated structure and a density of less than about 1.4. In the simplest instances, special additional devices are not required for this attachment. Thus, it is sufficient with threaded closures, particularly such with diameters of up to about 3 cm., for example if the disk of unsintered tetrafluoroethylene polymer with a fibrillated structure and a density of less than about 1.4 has an opening corresponding to the inside diameter of the hinged cover and is inserted into the cover which is provided with at least one opening. With closures having stoppers of rubber, cork and other conventional materials, the stopper need be provided only with at least one bore or a venting channel. The film of corresponding size is then placed on the container opening and the bored stopper is applied over it.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which FIG. 1 is a cross-sectional view in elevation of part of a container which is closed by one embodiment of this invention;

FIG. 2 is another fragmental cross-sectional view in elevation of part of another container closed by another embodiment of this invention;

FIG. 3 is still another cross-sectional view in elevation of still another embodiment of this invention;

FIG. 4 is a further fragmental cross-sectional view in elevation of a further embodiment of this invention;

FIG. 5 is still a further cross-sectional view in elevation of part of a pipe line which is closed by a further embodiment of this invention; and FIG. 6 is still a further cross-sectional view in elevation of part of a pipe line which is closed by still a further embodiment of this invention.

DESCRIPTION OF THE PREFERRED EMBODIMENTS

FIG. 1 shows a vertical cross-section through a venting closure such as it is particularly suitable for a narrow-necked bottle. Threaded cap 1 has an opening 4 in the center in the form of a bore or hole. Disk 3 consists of an unsintered tetrafluoroethylene polymer with a fibrillated structure and a density of less than about 1.4 and is inserted into cap. 1. If the closure, as illustrated in FIG. 1, is screwed on bottle 1, disk 3 lies completely across the bottle rim, the bottle thereby being tightly closed for the bottle contents. The material used for disk 3 is gas-permeable, so that gases, which form in the bottle during storage or transfer, may penetrate disk 3 and emerge into the atmosphere through opening 4 of the threaded closure.

Of course, threaded closure 1 also may be provided with several openings 4 in order to enable during a strong gas generation an easy withdrawal of the gases passing through disk 3 into the atmosphere.

The construction of openings 4 may be provided in various ways. In the simplest instance, these are cylindrical bores or holes, e.g. with diameters of about 0.5 to 3 mm. Openings 4, aside from other designs, may advantageously also have a conical section form, as shown in FIG. 2. FIG. 2 shows a vertical section through another design of a venting closure. This closure differs from that illustrated in FIG. 1 above all in that disk 3 of unsintered tetrafluoroethylene polymer with a fibrillated structure and a density of less than about 1.4 is arranged between the bottom of the threaded closure 1 and a supporting or countering disk 5, which has the same shape as disk 3. The supporting disk has an opening 6 in form of a hole, which suitably is situated opposite opening 4. Opening 4 in this design has a conical section form or construction in order to facilitate the escape of gas through the closure.

The supporting or countering disk 5 prevents a sagging into the bottle of disk 3 of unsintered tetrafluoroethylene polymer with a fibrillated structure and a density of less than about 1.4. Supporting disk 5 may be prepared from any suitable material such as metal or plastic. It may be snapped into the threaded cover 1 or be connected therewith in some other manner in order that said disk and disk 3 do not fall out of cover 1 during the unscrewing of the closure.

Just as cover 1 may have several opening 4, the supporting disk may also have several openings 6. It may also be constructed in the form of a lattice, mesh or grid plate.

FIGS. 3 and 4 show a venting closure each which is formed as a threaded closure with a sealing conical plug and a lockable core. The closures consist of the threaded cap 1, which has a sealing conical plug 7, known per se. Screwed into sealing plug 7 is a lockable core 8, which has a venting channel 9 bored through (in FIG. 4 with two venting channels). Stretched between lockable core 8 and the bottom of the threaded cover is the gas-permeable disk 3 of unsintered tetrafluoroethylene polymer with a fibrillated structure and a density of less than about 1.4. It is suitable to elevate the upper outer rim of the lockable core 8 and to form it as an elevated ridge or as elevated profile ring 10, which lies opposite the raised profile ring 11 of the inside cover bottom. Profile rings 10 and 11 are disposed against the rim of the sealing surfaces. It is achieved thereby that disk 3 of unsintered tetrafluoroethylene polymer with a fibrillated structure and a density of less than about 1.4 is held only by the ring-shaped ridges 10 and 11 and practically the entire surface of disk 3 is available for the passage of gas without coming in contact in the center with the cover bottom or the lockable core.

In FIG. 3, opening 4 is designed with vertical walls; in FIG. 4, with conical section walls. In the closure of FIG. 4, the ring-shaped ridge 10 at the rim of the lockable core has been eliminated.

Ring-shaped elevation or ridge 11, particularly in cooperation with ring-shaped elevation 10, effects a satisfactory sealing at the rim of disk 3. In addition, changes in position and shape of disk 3 are reliably prevented even with mechanical interference.

FIG. 5 shows a vertical section through a novel shutoff device for pipe lines. Numeral 12 designates the pipe with flanges 13 and 14 between which is arranged disk 3 of unsintered tetrafluoroethylene polymer with a fibrillated structure and a density of less than about 1.4. Flanges 13 and 14 are pressed together by screw connections, brackets or the like, not illustrated in the drawing. Of course, flanges 13 and 14 may also be equipped with distinct, elevated profile rings in order to assure a particularly secure holding and sealing of disk 3 between the flanges.

FIG. 6 shows a vertical section through another novel shutoff device, which differs from the design of that in FIG. 5 in that there are additionally arranged at both sides of disk 3 countering or supporting disks 15 of a mechanically-strong material, e.g. a suitable metal or a suitable synthetic material, such as hard polypropylene or the like. These supporting disks are bored through in numerous spots in order to provide openings 4 for the passage of gases.

The design of FIG. 1 above all is suitable for closures with a small diameter, while the other closures illustrated in FIG. 2–4 are suitable for container openings with a large diameter. The material for the threaded cap 1 and the lockable plugs is most simply and suitably a synthetic material, e.g. a moldable phenol resin, hard PVC or the like.

According to the present invention, not only threaded closures but also clamping covers, stoppers and the like may of course be constructed as venting closures. Instead of covering opening 4 of the closures with disks 3 of unsintered tetrafluoroethylene polymer with a fibrillated structure and a density of less than about 1.4, as occurs in the threaded closures of FIGS. 1 through 4, they may also be closed with respectively adapted shaped parts of unsintered tetrafluoroethylene polymer with a fibrillated structure and a density of less than about 1.4.

Unsintered tetrafluoroethylene polymer with a fibrillated structure and a density of less than about 1.4 is neither coarse-pored nor wettable. Consequently, liquids cannot penetrate the novel shutoff devices even after a considerable time. On the other hand, a film having about a 0.1 to 3 mm. and preferably 0.1 to 1 mm. thickness of unsintered tetrafluoroethylene polymer with a fibrillated structure and a density of less than about 1.4 allows the penetration of gases at slight pressure differentials of about 0.1 atmospheres, so that the occurrence of excess or reduced pressures in the containers closed with a closure of the invention is avoided. The pressure equalization may occur in both directions, i.e. from the interior of the container outwardly and the reverse. During an equalization of a reduced pressure in the container, no impurities can penetrate into the container from the outside. The novel closures prevent the emergence of liquids from the container upon an accidental inclination or tipping of the container.

Since the novel shutoff devices with slight pressure differences of greater than 0.1 atm bring about a pressure equalization between the gas chambers situated at both sides of the film, they act like safety valves or quasi-"breathing" shutoff devices. The material employed for the film is chemically inert in contact with most chemicals, particularly acids, lye solutions and solvents. It is stable in the range of about −240°C to +270°C, is non-combustible, and suffers no water absorption. It is softly flexible and may therefore suffer no breakage.

The novel shutoff devices may be manufactured in a simple manner, furthermore.

Containers, which are filled with gas-generating liquids or substances, are degassed satisfactorily when they are sealed with the closures of this invention. If it is prevented due to tipping or inversion that the gas space situated in the container borders on the gas-permeable film, then a bulging of the containers or closures sets in. After replacing the container into its normal position, a satisfactory pressure equalization is resumed. For a satisfactory operation of the novel shutoff devices, it is only necessary that the gases to be drawn off have the possibility of contacting this permeable film by means of a gas chamber bordering on the permeable film and that upon penetration of the permeable film they have the opportunity of flowing away from the permeable film.

I claim:

1. A gas-permeable liquid-tight sealing device for a container, comprising a closure for the container, a gas-permeable sealing film disposed within said closure, said film having a thickness of from about 0.1 to 3 mm. of unsintered tetrafluoroethylene polymer having a fibrillated structure and a density of less than about 1.4, and an opening in said closure disposed adjacent said film through which gases flowing through said film can pass while liquids are contained within said film.

2. A device as set forth in claim 1 wherein said film has a thickness of from 0.1 to 1 mm.

3. A device as set forth in claim 1 wherein the polymer comprises polytretrafluoroethylene.

4. A device as set forth in claim 1 wherein the polymer comprises a mixed polymer of tetrafluoroethylene and hexafluoropropylene.

5. A device as set forth in claim 1 wherein a retaining device is disposed within said closure and said film is maintained attached to said closure by said retaining device.

6. A device as set forth in claim 5 wherein said retaining device comprises a perforated sheet.

7. A device as set forth in claim 5 wherein said retaining device comprises a removable plug disposed within said closure, and said plug having an opening extending through it.

8. A device as set forth in claim 1 wherein said closure comprises a pair of perforated sheets and said film is disposed between said perforated sheets.

9. The process of sealing an opening in a container in a gas-permeable manner comprising the disposition of a film of gas-permeable material across the opening, the film having a thickness of from about 0.1 to 3 mm., comprising an unsintered tetrafluoroethylene polymer having a fibrillated structure and a density of less than about 1.4.

10. A process as set forth in claim 9 wherein said film has a thickness of from about 0.1 to 1 mm.

11. A process as set forth in claim 9 wherein said polymer comprises polytetrafluoroethylene.

12. A process as set forth in claim 9 wherein the polymer comprises a mixed polymer of tetrafluoroethylene and hexafluoropropylene.

13. A process as set forth in claim 9 wherein the film is supported by a perforation sheet.

14. A process as set forth in claim 9 wherein the film is supported on two sides by a perforated sheet.

* * * * *